(12) United States Patent
Koishi

(10) Patent No.: US 6,424,494 B1
(45) Date of Patent: Jul. 23, 2002

(54) FLYING HEAD SLIDER HAVING RAIL NARROWED NEAR TRAILING END

(75) Inventor: Ryosuke Koishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 56 days.

(21) Appl. No.: 09/606,424

(22) Filed: Jun. 29, 2000

(30) Foreign Application Priority Data

Nov. 24, 1999 (JP) ............................................ 11-332606

(51) Int. Cl.$^7$ ................................................. G11B 5/60
(52) U.S. Cl. ............................... 360/235.6; 360/236.4; 360/235.7; 360/236; 360/236.5
(58) Field of Search ............................... 360/235.4–240

(56) References Cited

U.S. PATENT DOCUMENTS

| | | | | |
|---|---|---|---|---|
| 5,777,825 A | * | 7/1998 | Dorius | 360/235.6 |
| 5,940,249 A | * | 8/1999 | Hendriks | 360/236.1 |
| 6,144,529 A | * | 11/2000 | Wada | 360/236.1 |

FOREIGN PATENT DOCUMENTS

| | | |
|---|---|---|
| JP | 7147071 | 6/1995 |
| JP | 721717 | 1/1996 |
| JP | 7147070 | 6/1996 |
| JP | 11191277 | 7/1999 |

\* cited by examiner

*Primary Examiner*—A. J. Heinz
(74) *Attorney, Agent, or Firm*—Greer, Burns & Crain, Ltd.

(57) ABSTRACT

A rail is formed on a medium-opposed surface of a slider body in a flying head slider. An air bearing surface is defined on the upper surface of the rail, which faces the medium. Projections are formed on the medium-opposed surface. The projections serve to space the air bearing surface from a medium such as a recording disk when the slider body contacts the recording disk. A trailing end of the rail is narrowed laterally along the trailing end of the medium-opposed surface. Even when the slider body contacts the recording disk at the trailing end, in addition to the projections, the contact area between the slider body and the recording disk is reduced because of the narrowed trailing end. Since the rail is narrowed without changing its original thickness or height from the bottom base of the medium-opposed surface, no additional processing is required to form the air bearing surface.

10 Claims, 9 Drawing Sheets

FLYING HEAD SLIDER HAVING RAIL NARROWED NEAR TRAILING END

BACKGROUND OF THE INVENTION

1. Field of the Invention

The present invention relates to a flying head slider in general employed in a recording disk drive such as hard disk drive (HDD), and in particular, to a flying head slider comprising a slider body, an air bearing surface (ABS) defined on a medium-opposed surface of the slider body, and a projection defining the tip end higher than the level of the air bearing surface upstream of the air bearing surface.

2. Description of the Prior Art

In the technical field of hard disk drives (HDDs), for example, a so-called contact start stop (CSS) control is well known in which a flying head slider conveying a magnetic read/write head is allowed to be seated on the surface of a magnetic recording disk when the magnetic recording disk stands still. In the CSS control, the seated flying head slider inevitably suffers from adsorption acting from a lubricating agent or oil spread over the surface of the magnetic recording disk. Projections or adsorption prevention pads are thus often formed on the air bearing surface so as to prevent the flying head slider from sticking to the surface of the magnetic recording disk, as is disclosed in Japanese Patent Application Laid-open No. 11-191277, for example. The adsorption prevention pads are designed to reduce the contact area between the flying head slider and the surface of the magnetic, recording disk so as to weaken adsorption acting from the lubricating oil to the flying head slider.

It is a trend in the technical field of HDDs to employ a so-called Hall-less motor as a spindle motor for diving the magnetic recording disk. No Hall element is employed in the Hall-less motor. The Hall-less motor accordingly controls the amount of rotation for the rotor without monitoring or detecting the rotational angle or position of the rotor. The Hall-less motor sometimes suffers from a reverse rotation of the rotation axis when the rotor starts rotating. Such a reverse rotation causes inclination of the flying head slider about the tip ends of the aforementioned adsorption prevention pads on the surface of the magnetic recording disk. The flying head slider is forced to contact the surface of the magnetic recording disk at the outflow or trailing edge in addition to the adsorption prevention pads. The effect of meniscus between the flying head slider and the magnetic recording disk is intensified so that a larger adsorption is induced between the flying head slider and the magnetic recording disk. The magnetic recording disk sometimes cannot even start rotating in this situation, because a recent spindle motor transmits less torque to the magnetic recording disk.

The flying head slier is proposed to comprise depressions on the top or roof surface of the rail so as to narrow the air bearing surface at the trailing edge of the roof surface, as mentioned in Japanese Patent Application Laid-open-No. 11-191277. The depressions are supposed to suppress the effect of meniscus at the trailing edge of the flying head slider when the flying head slider touches the surface of the magnetic recording disk at the trailing edge. However, if the depressions are to be formed on the top surface, an additional process should be included in the production method of the flying head slider. In addition, the flying height of the flying head slider may vary in response to reduction in the area of the air bearing surface. This is not preferable.

SUMMARY OF THE INVENTION

It is accordingly an object of the present invention to provide a flying head slider, not only capable of reducing or suppressing adsorption acting from a recording disk when the recording disk stands still, but also capable of contributing to facilitation of its production method.

According to a first aspect of the present invention, there is provided a flying head slider comprising: a slider body having a medium-opposed surface; an air bearing surface defined in the medium-opposed surface; a projection defining a tip end higher than the air bearing surf ace upstream of the air bearing surface; a rail extending over a bottom base of the medium-opposed surface for defining the air bearing surface at its top surface; and a step formed on the top surface of the rail at an upstream end of the air bearing surface, wherein the rail is tapered in a lateral direction of the slider body near an outflow end of the slider body.

For example, in a recording disk or medium drive employing the flying head slider, when a recording disk or medium stands still, the protrusion serves to keep the slider body of the flying head slider above the surface of the recording disk or medium. The air bearing surface is prevented from contacting the surface of the recording disk or medium. The contact area can be reduced between the slider body and the recording disk or medium as compared with the case where the air bearing surface is allowed to contact the surface of the recording disk. The slider body thus receives less adsorption or effect of meniscus from a lubricating oil or other liquid spread over the surface of the recording disk or medium.

Assume that the recording disk makes a reverse rotation. The slider body is supposed to contact the surface of the recording disk at the outflow end or trailing edge of the slier body in addition to the aforementioned projection. However, since the downstream end of the rail is narrowed in the lateral direction, the air bearing surface can also be narrowed near the outflow end of the slider body. Increase in the contact area can be suppressed or prevented between the slide body and the surface of the recording disk. Less adsorption or effect of meniscus is only allowed to act on the slider body from the lubricating oil or other liquid spread over the surface of the recording disk. The adsorption or friction is not intensified between the slider body and the recording disk. Less torque still allows the recording disk to normally start rotating.

After the recording disk has started rotating, the slider body receives, at the medium-opposed surface, air flow generated along the surface of the recording disk. The airflow acts on the step and the air bearing surface in sequence. The step serves to generate a larger lift or positive pressure at the air bearing surface. The lift allows the slider body to fly above the surface of the recording disk. Even if the air bearing surface suffers from reduction in the area in response to the aforementioned narrowed downstream end, the step serves to prevent variation in the lift at the air bearing surface to the utmost.

In general, the flying head slider is figured out of a wafer or other substrate. When the rail is shaped, a resist film is formed on the surface of the substrate for defining the pattern of the rail, for example. Since the rail is narrowed in the above-described manner so as to keep its original thickness or height on the bottom base, it is possible to reduce the area of the air bearing surface near the outflow end of the slider body only by changing the pattern in the resist film. No additional process may be required to form the air bearing surface having the downstream end narrowed in the lateral direction. The production method can be kept simplified irrespective of reduction in the area of the air bearing surface.

According to a second aspect of the present invention, there is provided a flying head slider comprising: a slider body having a medium-opposed surface; a front air bearing surface defined in the medium-opposed surface at an upstream position; a rear air bearing surface defined in the medium-opposed surface at a downstream position; a projection defining a tip end higher than at least the rear air bearing surface upstream of the rear air bearing surface; a rail extending over a bottom base of the medium-opposed surface for defining the rear air bearing surface at its top surface; and a step formed on the top surface of the rail at an upstream end of the rear air bearing surface, wherein the rail is tapered in a lateral direction of the slider body near an outflow end of the slider body.

The front and rear air bearing surfaces are designed to generate lift or positive pressure when the flying head slider receives airflow at the medium-opposed surface. A larger lift can reliably be generated in a relatively facilitated manner. In particular, the flying head slider is preferably allowed to generate negative pressure balanced with the lift or positive pressure at the medium-opposed surface. Such combination of the positive and negative pressures serves to stabilize the flying height of the flying head slider above a recording disk or medium. The flying head slider of the second aspect is adapted to also achieve the advantages similar to those of the above-described flying head slider according to the first aspect.

Furthermore, according to a third aspect of the present invention, there is provided a flying head slider comprising: a slider body having a medium-opposed surface; a primary rail of a predetermined thickness extending over a bottom base of the medium-opposed surface toward an outflow end of the slider body; a slim column designed to stand on the bottom base by a height equal to the predetermined thickness for defining a top surface narrower in a lateral direction of the slider body than a top surface of the primary rail, the slim column continuous to a downstream end of the primary rail; an air bearing surface defined on the top surfaces of the primary rail and slim column; a step defined on the top surface of the primary rail at an upstream end of the air bearing surface; and a projection defining a tip end higher than at least the air bearing surface upstream of the air bearing surface.

The protrusion of this aspect likewise serves to reduce the contact area between the slider body of the flying head slider and the surface of a recording disk or medium in the aforementioned manner as compared with the case where air bearing surface is allowed to contact the surface of the recording disk or medium. The slider body thus receives less adsorption or effect of meniscus from a lubricating oil or other liquid spread over the surface of the recording disk.

Assume that the recording disk makes a reverse rotation. The slider body is supposed to contact the surface of the recording disk at the outflow end or trailing edge of the slider body in addition to the aforementioned projection. However, since the top surface of the slim column, narrower in the lateral direction, is designed to define the air bearing surface near the outflow end of the slider body, the area of the air bearing surface can be reduced near the outflow end. Increase in the contact area can be suppressed or prevented between the slider body and the surface of the recording disk. The adsorption or effect of meniscus is likewise not intensified between the slider body and the recording disk. Less torque still allows the recording disk to normally start rotating.

After the recording disk has started rotating, the slider body receives, at the medium-opposed surface, airflow generated along the surface of the recording disk. The airflow acts on the step and the air bearing surface in sequence. The step serves to generate a larger lift or positive pressure at the air bearing surface. The lift allows the slider body to fly above the surface of the recording disk. Even if the air bearing surface suffers from reduction in the area in response to the aforementioned narrowed downstream end, the step serves to prevent variation in the lift at the air bearing surface to the utmost.

In general, the flying head slider is figured out of a wafer or other substrate. The aforementioned primary rail and the slim column can simultaneously be formed. No additional process may be required to form the air bearing surface having the downstream end narrowed in the lateral direction. The production method can be kept simplified irrespective of reduction in the area of the air bearing surface.

According to a fourth aspect of the present invention, there is provided a flying head slider comprising: a slider body having a medium-opposed surface; a front rail extending over a bottom base of the medium-opposed surface at an upstream position; a front air bearing surface defined on a top surface of the front rail; a primary rear rail of a predetermined thickness extending over a bottom base of the medium-opposed surface at a downstream position; a slim column designed to stand on the bottom base by a height equal to the predetermined thickness for defining a top surface narrower in a lateral direction of the slider body than a top surface of the primary rear rail, the slim column continuous to a downstream end of the primary rear rail; a rear air bearing surface defined on the top surfaces of the primary rear rail and slim column; a step defined on the top surface of the primary rear rail at an upstream end of the rear air bearing surface; and a projection defining a tip end higher than at least the rear air bearing surface upstream of the rear air bearing surface.

The front and rear air bearing surfaces are designed to generate lift or positive pressure when the flying head slider receives airflow at the medium-opposed surface. A larger lift can reliably be generated in a relatively facilitated manner. In particular, the flying head slider is preferably allowed to generate negative pressure balanced with the lift or positive pressure at the medium-opposed surface. Such combination of the positive and negative pressures serves to stabilize the flying height of the flying head slider above a recording disk or medium. The flying head slider of the fourth aspect is adapted to also achieve the advantages similar to those of the above-described flying head slider according to the third aspect.

In any of the aforementioned flying head slider, the projection is preferably designed to stand on a plane which level is lower than the air bearing surface or at least the rear air bearing surface. In these cases, the projection is allowed to have enough height as compared with the case where the projection is designed to stand on the air bearing surface such as the front and rear air bearing surfaces. The higher projection serves to reliably suppress or prevent adsorption or effect of meniscus between the slider body and the surface of the recording disk or medium. On the other hand, a lower projection cannot sufficiently suppress effect of meniscus acting from a lubricating oil or other liquid spread over the surface of the recording disk or medium since the lubricating oil or other liquid is supposed to easily flow upward along the projection until it reaches the slider body.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
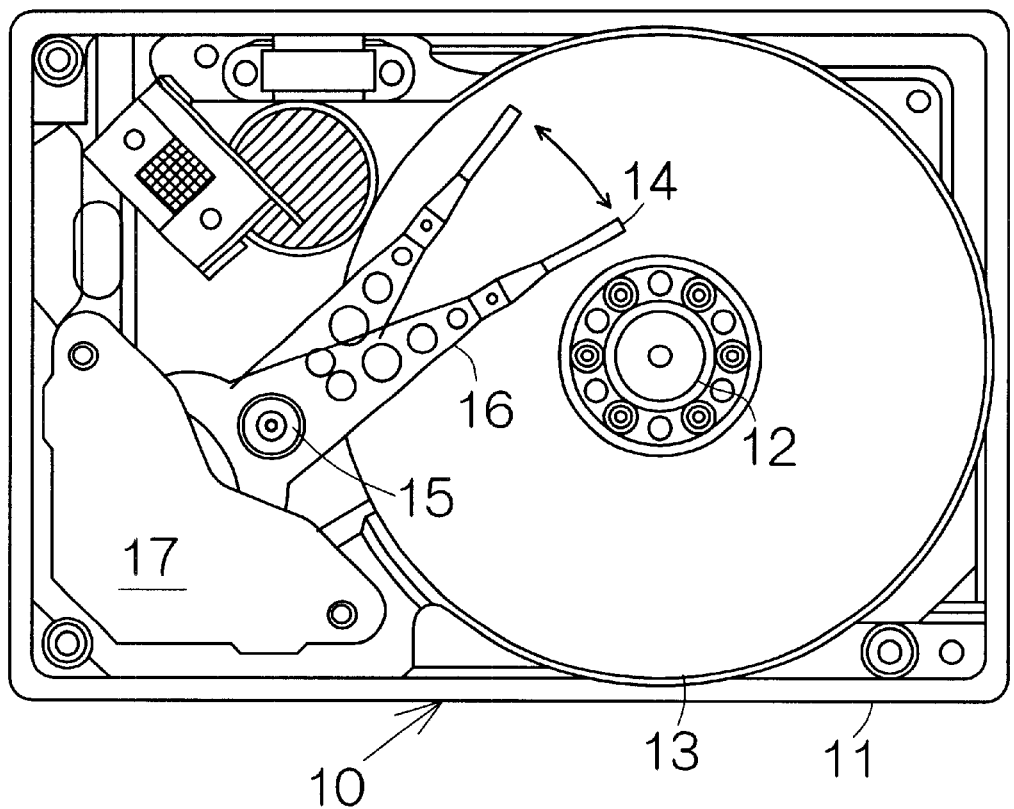
FIG. 1 is a plan view schematically illustrating the inner structure of a hard disk drive (HDD)

FIG. 1 schematically illustrates the structure of a hard disk drive (HDD) 10 as an example of a recording disk drive or a magnetic data storage system. The HDD 10 includes a housing or enclosure 11 enclosing at least a magnetic recording disk 13 mounted on a spindle motor 12 and at least a flying head slider 14 opposed to the corresponding surface of the magnetic recording disk 13. The spindle motor 12 is designed to drive the magnetic recording disk 13 for rotation about its rotation axis. A Hall-less motor employing no Hall element is, for example, selected as the spindle motor 12. The enclosure 11 may contain a plurality of the magnetic recording disks 13.

The flying head slider 14 is fixed at the tip end of a carriage arm 16 capable of swinging about a support axis 15. When information data is written into or read out of the magnetic recording disk 13, an actuator comprising a magnetic circuit such as a voice coil motor is designed to swing the carriage arm 16. The flying head slider 14 is moved in the radial direction of the magnetic recording disk 13. Such radial movement allows the flying head slider 14 to be positioned right above a target recording or data track on the surface of the magnetic recording disk 13. A cover, not shown, may be coupled to the enclosure 11 to define a closed space within the cover and the enclosure 11.

Figure 2:
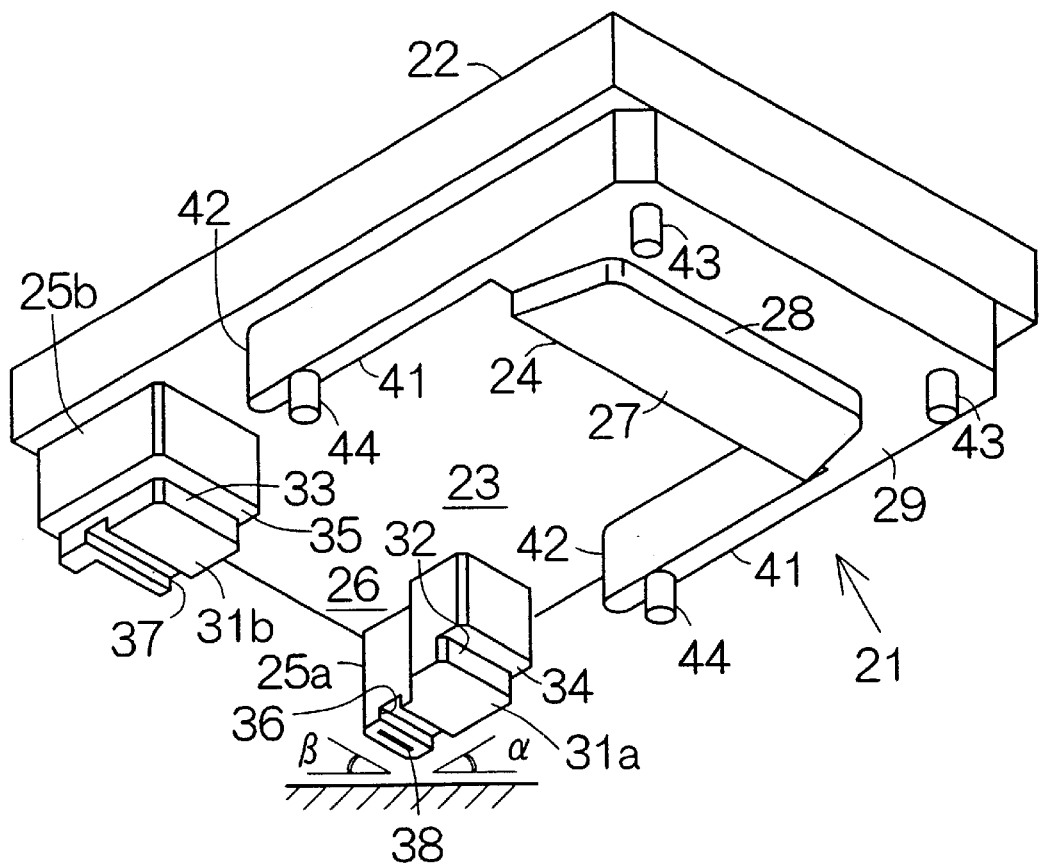
FIG. 2 is an enlarged perspective view schematically illustrating the structure of a flying head slider according to the present invention.

FIG. 2 schematically illustrates the structure of the flying head slider 14 in detail. The flying head slider 14 comprises a slider body 22 opposed to the magnetic recording disk 13 at a medium-opposed surface or bottom surface 21. A front rail 24 is formed on the slider body 22 so as to swell from a planar bottom base 23 of the bottom surface 21 at an upstream position by a predetermined thickness H(=1.5–2.0 μm), for example. The front rail 24 extends in the lateral direction of the slider body 22 along the inflow end or leading edge of the slider body 22. Likewise, a pair of rear rails 25a, 25b are formed on the slider body 22 so as to swell from the bottom base 23 at downstream positions spaced in the lateral direction so as to define an airflow passage 26 therebetween. The rear rails 25a, 25b extend toward the outflow end or trailing edge of the slider body 22 by the aforementioned predetermined thickness H over the bottom base 23. "Upstream" or "downstream" position can be defined based on the direction of airflow generated when the magnetic recording disk 13 rotates.

A front air bearing surface 27 is defined on the top surface of the front rail 24 so as to extend in the lateral direction of the slider body 22. A step 28 is formed on the top surface of the front rail 24 at the upstream end of the front air bearing surface 27. As is apparent from FIG. 2, the step 28 may surround the contour of the front air bearing surface 27 except the downstream end, for example. The step 28 serves to define a lower level surface 29 extending over a level plane lower than the front air bearing surface 27. When the magnetic recording disk 13 rotates to generate airflow along its surface, the airflow flows along the lower level surface 29, the step 28 and the front air bearing surface 27 in sequence. The step 28 serves to generate a larger lift or positive pressure at the front air bearing surface 27.

First and second rear air bearing surfaces 31a, 31b are defined on the top surfaces of the rear rails 25a, 25b, respectively. The first and second rear air bearing surfaces 31a, 31b are spaced from each other in the lateral direction of the slider body 22. A step 32 is formed on the top surface of the rear rail 25a at the upstream end of the first rear air bearing surface 31a. Likewise, a step 33 is formed on the top surface of the rear rail 25b at the upstream end of the second rear air bearing surface 31b. As is apparent from FIG. 2, the step 33 may extend toward the outflow end or trailing edge of the slider body 22 along the contour of the second rear air bearing surface 31b. The steps 32, 33 serve to respectively define lower level surfaces 34, 35 extending over a level plane lower than the first and second rear air bearing surfaces 31a, 31b. When the magnetic recording disk 13 rotates to generate airflow along its surface, the airflow flows along the lower level surfaces 34, 35, the step 32, 33 and the first and second rear air bearing surfaces 31a, 31b in sequence, respectively. The steps 34, 35 serve to generate larger lifts or positive pressures at the first and second rear air bearing surfaces 31a, 31b, respectively. A stripe of groove 36, 37 is formed on each of the first and second rear air bearing surfaces 31a, 31b so as to extend in the lateral direction.

Here, lift generated at the first and second rear air bearing surfaces 31a, 31b is set smaller than that at the front air bearing surface 27 in the flying head slider 14. Accordingly, the slider body 22 keeps a slant attitude by a pitch angle α during flying. "Pitch angle α" may be referred to as an inclination angle along the longitudinal direction of the slider body 22 or in the direction of the airflow.

In addition, lift generated at the second rear air bearing surface 31b is set larger than that at the first rear air bearing surface 31a. Accordingly, the slider body 22 keeps a slant attitude by a roll angle β during flying. "Roll angle β" may be referred to as an inclination angle along the lateral direction of the slider body 22 or in the perpendicular direction to the airflow.

A magnetic transducer or read/write head element is embedded in the rear rail 25a. The read/write head element is designed to expose its read and write gaps 38 at the smaller first rear air bearing surface 31a. A combination of the pitch angle α and the roll angle β serves to minimize the distance between the slider body 22 and the surface of the magnetic recording disk 13 in the vicinity of the read and write gaps 38. The read/write head element is allowed to efficiently read and write information data out of and into the magnetic recording disk 13. The read/write head element may comprise a read element such as a giant magnetoresistive element and a write element such as a thin film magnetic head utilizing a thin film coil pattern.

A pair of side rails 41 are connected to the opposite lateral ends of the front rail 24 so as to extend downstream toward the rear rails 25a, 25b on the bottom base 23 of the slider body 22. The side rails 41 serve to prevent airflow, which has received at the front wall of the front rail 24, from entering a space behind the front rail 24 around the lateral ends of the front rail 24. The airflow having crossed the front air bearing surface 27 is inevitably forced to spread in the direction vertical to the bottom base 23. This rapid spread of the airflow generates negative pressure behind the front rail 24. When the generated negative pressure is balanced with the aforementioned lift at the front and rear air bearing surfaces 27, 31a, 31b, the flying height of the slider body 22 can be fixed. Gaps or cracks 42 are defined between the side rails 41 and the rear rails 25a, 25b, respectively, so as to draw the airflow flowing around the lateral ends of the front rail 24 into the airflow passage 26. The side rails 41 are designed to define the top surfaces leveled with the lower level surface 29 of the front rail 24. In other words, the top surfaces of the side rails 41 are continuous to the lower level surface 29 of the front rail 24.

As is apparent from FIG. 2, a pair of front and rear protrusions, namely, adsorption prevention pads 43, 44 are respectively formed on the front rail 24 and the side rails 41 so as to stand from the lower level surface 29 and the top surfaces of the side rails 41. The respective adsorption prevention pads 43, 44 are designed to define the tip ends higher than the level of the front air bearing surface 27 and the first and second rear air bearing surfaces 31a, 31b.

The front adsorption prevention pads 43 are located at positions closest to the inflow end or leading edge of the slider body 22. The rear adsorption prevention pads 44 are located at positions remote from the outflow end or trailing edge of the slider body 22. Such locations of the adsorption prevention pads 43, 44 serve to reliably prevent the rear adsorption prevention pads 44 from colliding against the magnetic recording disk 13, even when the slider body 22 is maintained at the slant attitude of the pitch angle α during flying in the above-described manner so as to allow the gaps 38 of the read/write element to get closer to the surface of the magnetic recording disk 13 to the utmost.

Figure 3:
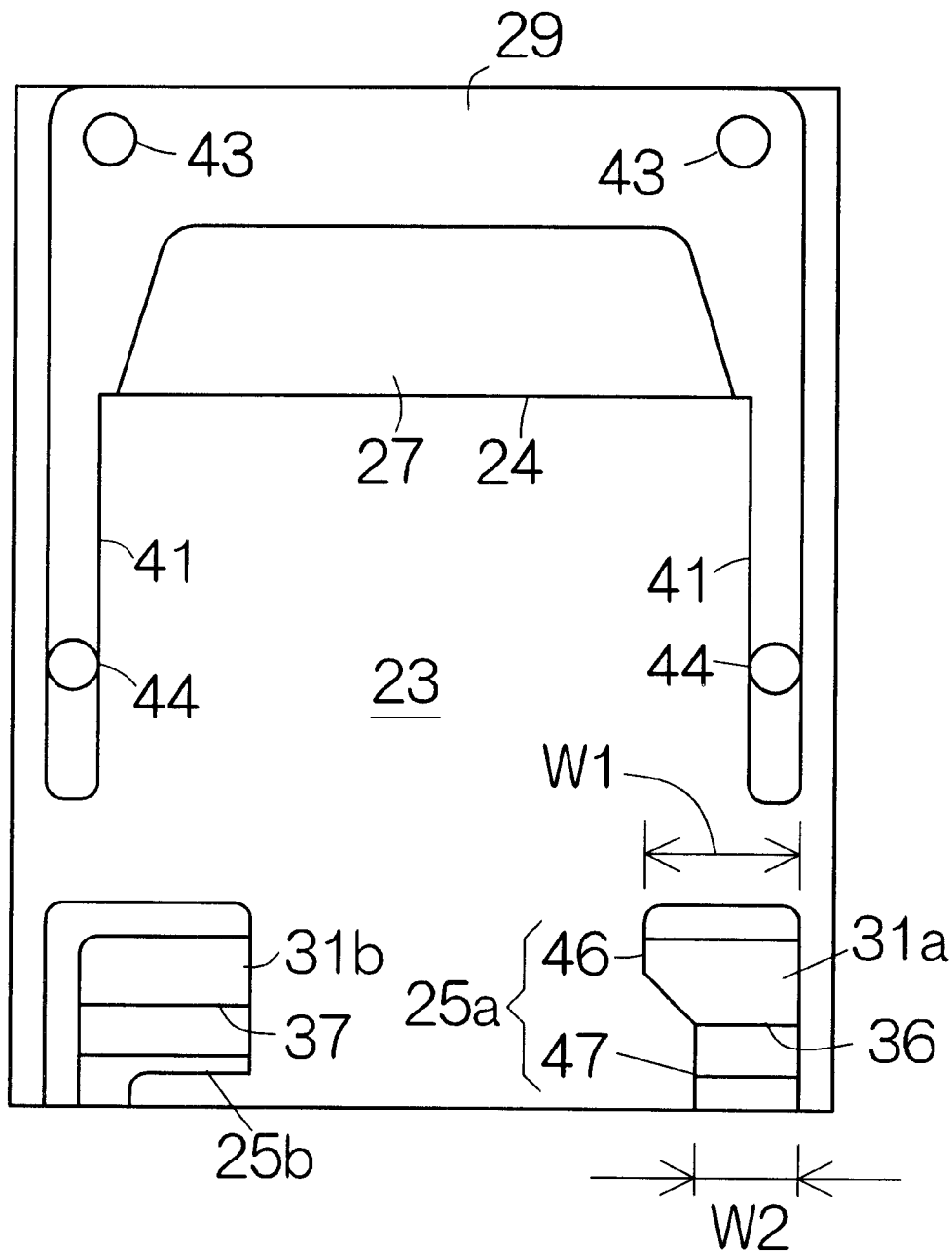
FIG. 3 is a plan view illustrating a bottom surface of a slider body.

As is apparent from FIG. 3, the rear rail 25a is tapered toward the trailing edge of the slider body 22. The rear rail 25a thus has a downstream end narrowed in the lateral direction near the trailing edge of the slider body 22. The rear rail 25a is designed to comprise a primary rear rail 46 located at a downstream position and a slim column 47 continuous to the downstream of the primary rear rail 46. The primary rear rail 46 is designed to extend over the bottom base 23 by the predetermined thickness H. The slim column 47 is designed to stand from the bottom base 23 by a height equal to the predetermined thickness H. The slim column 47 has the lateral dimension W2 narrower than the regular lateral dimension W1 of the primary rear rail 46. The first rear air bearing surface 31a is defined on the continuous top surfaces of the primary rear rail 46 and slim column 47.

Figure 4:
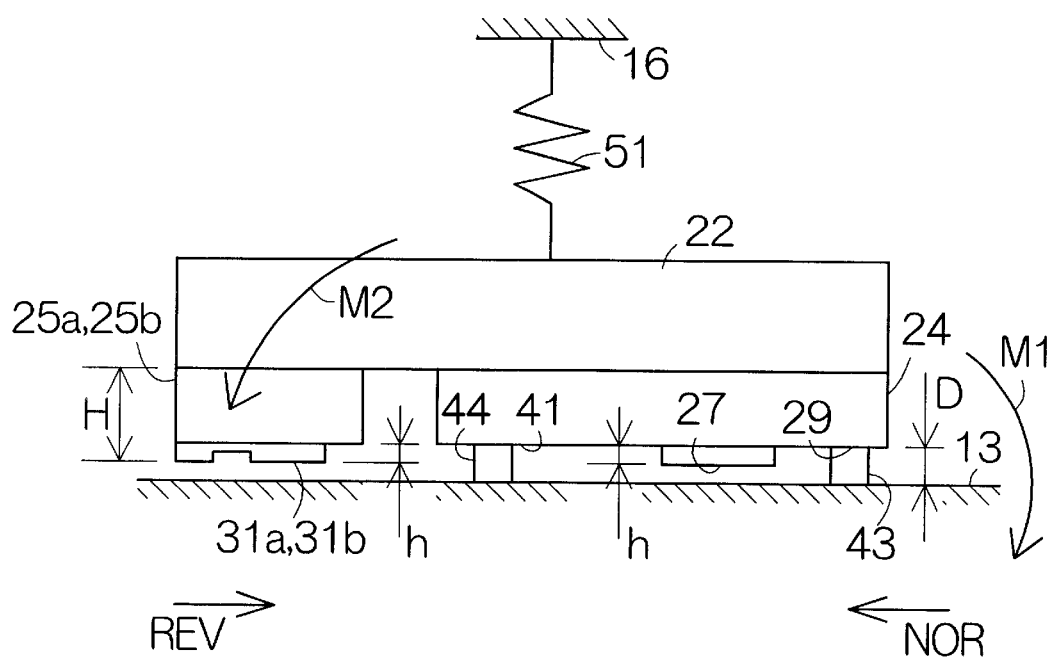
FIG. 4 is a side view schematically illustrating the slider body seated on the surface of a magnetic recording disk when the magnetic recording disk stands still.

When the magnetic recording disk 13 stands still, as shown in FIG. 4, the slider body 22 of the flying head slider 14 is seated on the surface of the magnetic recording disk 13. The adsorption prevention pads 43, 44 serve to keep the slider body 22 above a lubricating agent or oil spread over the surface of the magnetic recording disk 13. The front and rear air bearing surfaces 27, 31a, 31b are prevented from contacting the magnetic recording disk 13. The contact area can remarkably be reduced between the slider body 22 and the magnetic recording disk 13 as compared with the case where the air bearing surfaces 27, 31a, 31b are allowed to contact the surface of the magnetic recording disk 13. The slider body 22 thus receives less adsorption from the lubricating oil spread over the surface of magnetic recording disk 13.

Moreover, in this flying head slider 14, the adsorption prevention pads 43, 44 are designed to stand on the lower level surface 29 and the top surface of the side rails 41 lower than the front and rear air bearing surfaces 27, 31a, 31b by a fall h(=250 nm approximately), for example. The adsorption prevention pads 43, 44 are allowed to have enough height D(=200 nm–300 nm approximately). On the other hand, a projection or pad may have a height of approximately 30 nm if the projection or pad is designed to stand on an air bearing surface. A lower projection or pad cannot suppress the effect of meniscus acting from a superior lubricating oil spread over the surface of the magnetic recording disk by a thickness extending between 10 nm and 20 nm.

When the HDD 10 receives instructions to read or write information data, the spindle motor 12 starts to drive the magnetic recording disk 13 for rotation. The rotation of the magnetic recording disk 13 induces an airflow along the surface of the magnetic recording disk 13. The airflow acts on the front and rear air bearing surfaces 27, 31a, 31b, so that lift can be generated at the respective air bearing surfaces 27, 31a, 31b. The lift allows the flying head slider 14 to fly above the surface of the magnetic recording disk 13. During flight, the read/write head element is allowed to read or write information data at the read and write gaps 38 opposed to the surface of the magnetic recording disk 13.

In general, the flying head slider 14, namely, the slider body 22 is supported at the tip end of the carriage arm 16 via a resilient suspension or gimbal spring 51. The rigid carriage arm 16 is adapted to regulate the movement of the slider body 22, while the resilient suspension 51 allows the slight movement of the slider body 22. When the magnetic recording disk 13 starts rotating, the surface of the magnetic recording disk 13 moves in the normal direction NOR, so that a moment M1 around the tip ends of the front adsorption prevention pads 43 acts on the slider body 22. Such moment M1 tries to incline the slider body 22 forward about the tip ends of the front adsorption prevention pads 43. However, the slider body 22 hardly inclines upstream irrespective of the moment M1, since the front adsorption prevention pads 43 are located at the inflow end of the slider body 22. Any inclination of the slider body 22 can reliably be avoided irrespective of the moment M1.

Heretofore, a spindle motor hardly induces a reverse rotation of the rotation axis, namely, a magnetic recording disk, because the spindle motor employs Hall elements to control the rotation of the rotor. The Hall elements are used to detect the rotational position or angle of the rotor or rotation axis. The rotation of the rotor can precisely be controlled based on the detected rotational position or angle. When the magnetic recording disk is expected to start rotating, the relative position can be detected between the magnets of the rotor and the coils of the stator in the spindle motor. Electric current is supplied to the coils in response to the detection, so that it is possible to reliably prevent a reverse rotation of the rotor.

Recently, it is proposed to employ a so-called Hall-less motor, in place of the aforementioned spindle motor, in the HDD 10 so as to achieve the reduction in size of a spindle motor by omitting Hall elements. The Hall-less motor is designed to supply electric current to the coils of the stator at the beginning of the rotation of the rotor without detecting the relative position between the magnets of the rotor and the coils of the stator. Some of the relative positions cause a reverse rotation of the rotor. The Hall-less motor cannot completely restrain a reverse rotation of the rotor.

If the magnetic recording disk 13 suffers from a reverse rotation at the beginning of the normal rotation, as is apparent from FIG. 4, the surface of the magnetic recording disk 13 moves in the abnormal or reverse direction REV. Such movement of the surface generates a moment M2 around the tip ends of the rear adsorption prevention pads 44 in the direction opposite to the moment M1. The moment M2 easily causes the slider body 22 to incline downstream about the tip ends of the rear adsorption prevention pads 44, because the rear adsorption prevention pads 44 are positioned far from the outflow end of the slider body 22, as described above. The inclination causes the slider body 22 to contact the surface of the magnetic recording disk 13 at the outflow end.

According to the flying head slider 14 of the present embodiment, the top surface of the slim column 47 serves to reduce the contact area between the slider body 22 and the surface of the magnetic recording disk 13 even when the slider body 22 is seated on the surface of the magnetic recording disk 13 at the outflow end upon the reverse rotation of the disk 13. In addition, the grooves 36, 37 formed on the first and second rear air bearing surfaces 31a, 31b serve to accomplish a further reduction in the contact area between the slider body 22 and the surface of the magnetic recording disk 13. Accordingly, less adsorption or effect of meniscus is only allowed to act on the slider body 22 from the lubricating oil or other liquid spread over the surface of the magnetic recording disk 13. The adsorption or friction is not intensified between the slider body 22 and the magnetic recording disk 13. Less torque of the spindle motor 12 still allows the magnetic recording disk 13 to normally start rotating.

Figure 5:
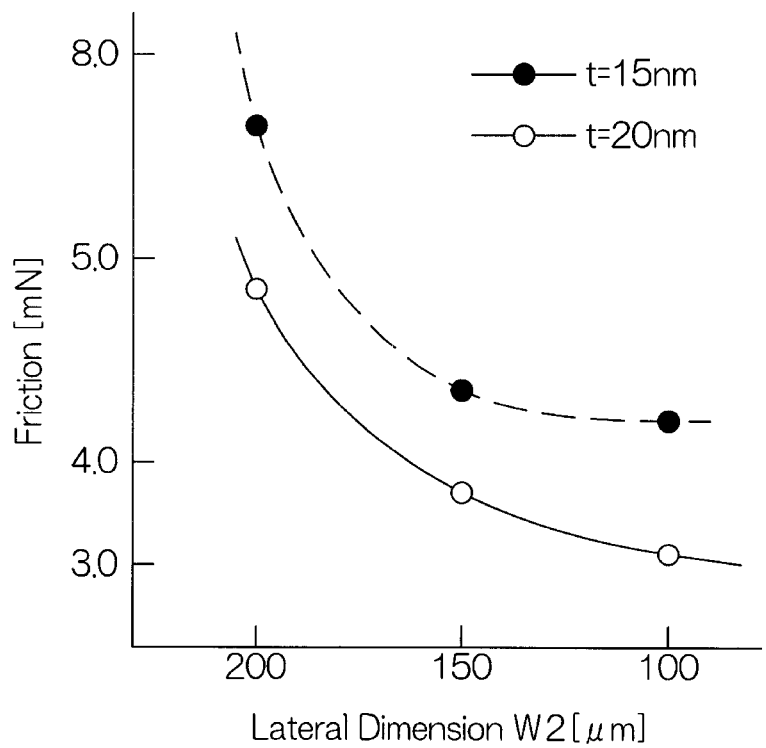
FIG. 5 is a graph illustrating the relationship between the magnitude of friction and the lateral dimension W2 of the rear rail.

The present inventor has measured in an experiment a force required to start moving the slider body 22 on the surface of the magnetic recording disk 13. The force is supposed to correspond to the friction or adsorption acting on the slider body 22 from a lubricating oil spread over the surface of the magnetic recording disk 13. Three types of the slider body 22 has been prepared in the experiment. The first body 22 has the rear rail 25a designed to have the lateral dimension W2=200 $\mu$m. The second and third ones have the rear rails 25a designed to have the lateral dimension W2=150 $\mu$m and W2=100 $\mu$m, respectively. The regular lateral dimension W1 is commonly set at 200 $\mu$m in all the slider bodies 22. The friction has been measured for each of the slider bodies 22 on a lubricating oil of the thickness set at t=15 nm and a lubricating oil of the thickness at =20 nm, respectively. The experiment has revealed that ,as is apparent from FIG. 5, reduction in the friction can reliably be achieved for both the lubricating oils of thickness t=15 nm and t=20 nm as the lateral dimension W2 of the rear rail 25a, namely, the slim column 47 gets smaller in the flying head slider 14.

Next, a description will briefly be made on a method of producing the aforementioned flying head slider 14. First of all, a plurality of read/write head elements are formed on the surface of an $Al_2O_3$ layer overlaid all over the surface of an $Al_2O_3$—TiC wafer, as conventionally known. Each read/write head element is located within a block which is to be cut off into a single flying head slider 14 or slider body 22. For example, 100×100=10,000 slider bodies 22 in total may be taken out of the single wafer of 5 inches diameter. The head elements are thereafter covered with an $Al_2O_3$ protection layer. The head elements thus embedded in the $Al_2O_3$ protection layer of approximately 50 $\mu$m thickness can be obtained in this manner.

After the formation of the head elements has been completed, rows of the aforementioned blocks are then cut off from the wafer into wafer bars, respectively. The exposed surface of the wafer bar is shaped into the bottom surface 21 of the slider body 22. Thereafter, each block is cut off from the wafer bar into a slider body 22, namely, a flying head slider 14.

Figure 6A:
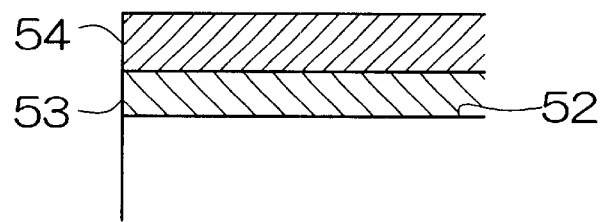
FIGS. 6A to 6C are enlarged partial sectional view schematically illustrating the process of shaping the bottom surface.

When the bottom surfaces 21 are shaped, as shown in FIG. 6A, a first diamond-like-carbon (DLC) layer 53 of approximately 5 nm thickness is formed on the exposed surface 52 of the wafer bar by sputtering or the like. The first DLC layer 53 is overlaid on an Si or SiC adsorption layer of approximately 2 nm thickness covered over the exposed surface 52. Such adsorption layer may be formed by sputtering, for example. The first DLC layer 53 functions as a protection layer for protecting the exposed surface 52, namely, the bottom surface 21 of the slider body 22. A second DLC layer 54 is overlaid on the surface of the first DLC layer 53. An Si or SiC adsorption layer is likewise interposed between the first and second DLC layers 53, 54. The thickness of the second DLC layer 54 may be set at approximately 30–40 nm, for example.

Figure 6B:
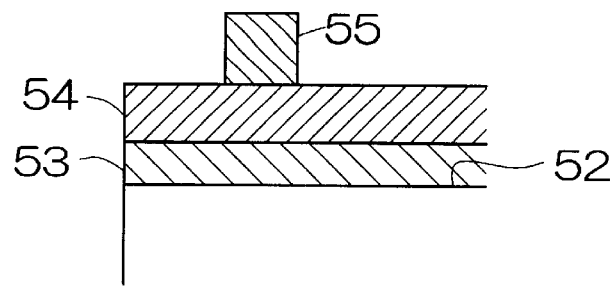
Figure 6C:
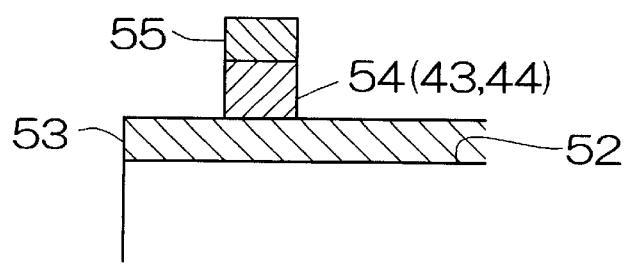

As shown in FIG. 6B, a photoresist film 55 is then formed on the second DLC layer 54 for defining patterns of the adsorption prevention pads 43, 44. When the second DLC layer 54 is subjected to an RIE (reactive ion etching) process, for example, the second DLC layer 54 and the underlaid adsorption layer are removed in the vicinity of the photoresist film 55. The adsorption prevention pads 43, 44 are thus figured out of the second DLC layer 54 below the photoresist film 55, as shown in FIG. 6C.

Figure 7A:
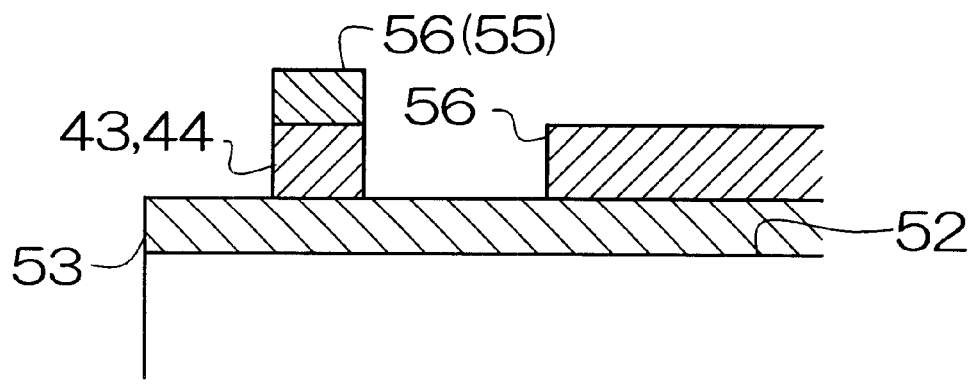
FIGS. 7A and 7B are enlarged partial sectional view schematically illustrating the process of shaping the bottom surface.
Figure 7B:
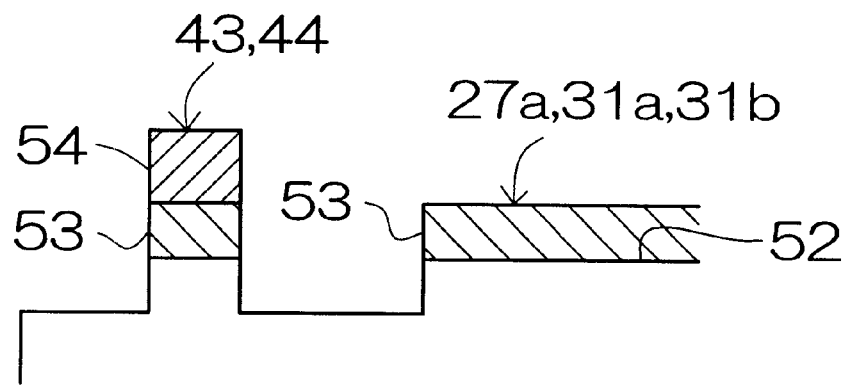

A photoresist film 56 is thereafter formed on the exposed surface of the first DLC layer 53, as shown in FIG. 7A, for defining patterns of the front and rear air bearing surfaces 27, 31a, 31b. When the first DLC layer 53 is subjected to an ion milling process, for example, the first DLC layer 53, the underlaid adsorption layer and the body of the wafer bar are in sequence removed in the vicinity of the photoresist film 56. The front and rear air bearing surfaces 27, 31a, 31b are thus figured out below the photoresist film 56, as shown in FIG. 7B. The grooves 36, 37 may be formed at the same time When the front and rear air bearing surfaces a 31a, 31b have been shaped out, the formation of the adsorption prevention pads 43, 44 is also completed. Since the photoresist films 55, 56 are designed to cover over the tip ends of the Adsorption prevention pads 43, 44 which have been figured out of the second DLC layer 54, the ion milling process is not suppose to remove the tip ends of the adsorption prevention pads 43, 44. Accordingly, the height D of the adsorption prevention pads 43, 44 can reliably be set in a predetermined range between 200 nm and 300 nm.

Figure 8A:
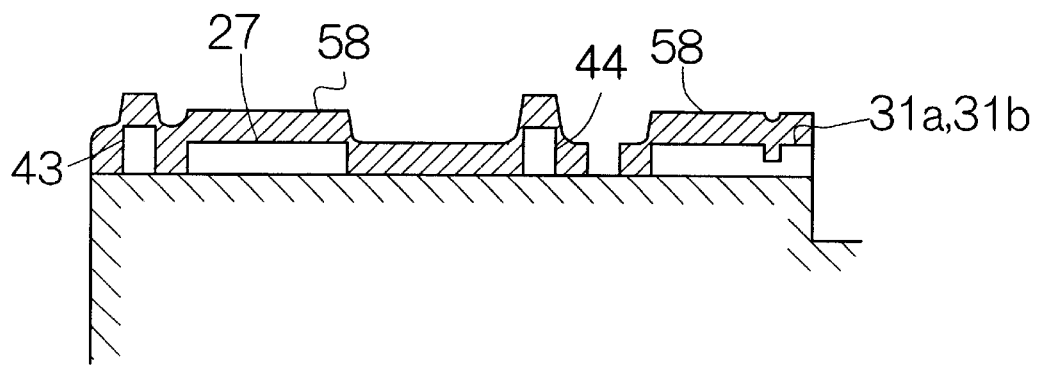
FIGS. 8A and 8B are enlarged partial sectional view schematically illustrating the process of shaping the bottom surface.

As shown in FIG. 8A, a photoresist film 48 is then formed on the exposed surface 52 of the wafer bar for defining patterns of the front rail 24, the side rails 41 and the rear rails 25a, 25b. The photo resist film 58 is designed to cover over the front and rear air bearing surfaces 27, 31a, 31b and the adsorption prevention pads 43, 44 all previously figured out.

Figure 8B:
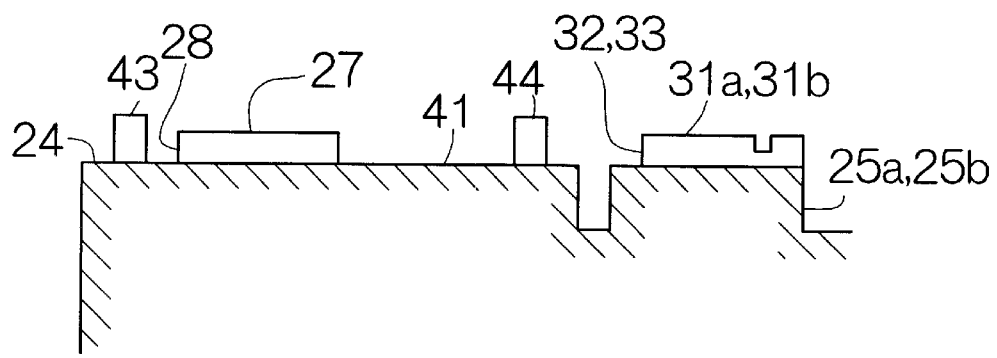

When an ion milling process or the like is conducted, for example, the body of the wafer bar is further removed in the vicinity of the photoresist film 58. The front, side and rear rails 24, 41, 25a, 25b, are thus figured out below the photoresist film 58, as shown in FIG. 8B.

In figuring the rear rail 25a, the primary rear rail 46 and the slim column 47 are simultaneously formed. Even when the narrowed downstream end is to be formed on the first rear air bearing surface 31a, no additional-process is required. Accordingly, the production method of the flying head slider 14 can be kept simplified irrespective of the narrowed downstream end defined on the first rear air bearing surface 31a.

When the photoresist film 58 is finally removed, the front and rear air bearing surfaces 27, 31a, 31b, in addition to the adsorption prevention pads 43, 44, appear on the top surfaces of the front, side and rear rails 24, 41, 25a, 25b. The front and rear air bearing surfaces 27, 31a, 31b are designed to have the top surfaces covered with the first DLC layer 53, while the adsorption prevention pads 43, 44 are designed to have the tip ends covered with the second DLC layer 54. The steps 28, 32, 33 are formed at the upstream ends of the front and rear air bearing surfaces 27, 31a, 31b, respectively. The bottom surface 21 is shaped in this manner.

Figure 9:
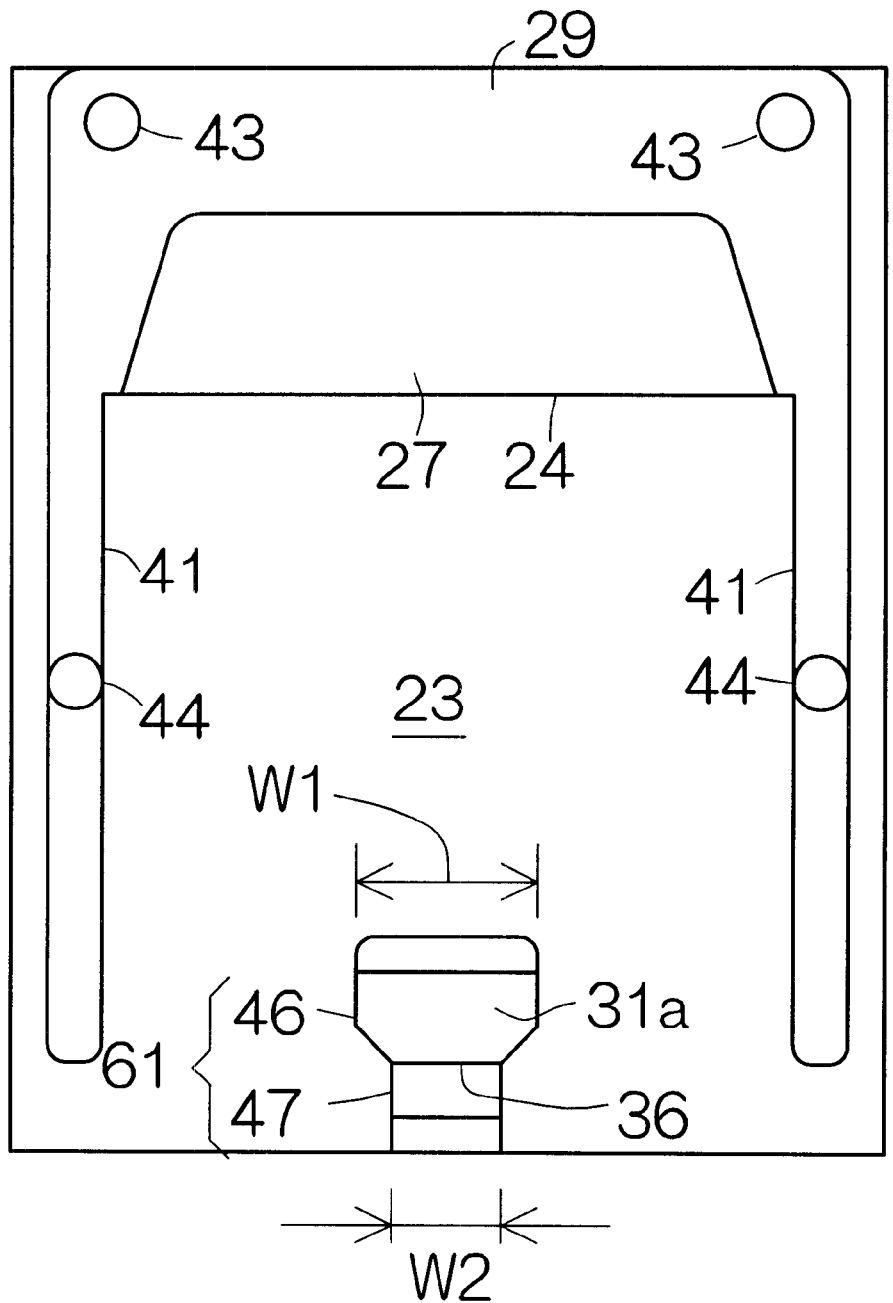
FIG. 9 is a plan view schematically illustrating the structure of a flying head slider according to a modified embodiment of the present invention.

In the aforementioned flying head slider 14, the rear rail 25b may also have the downstream end narrowed in the lateral direction of the slider body 22 near the outflow end of the slider body 22. In this case, the rear rail 25b may comprise a primary rear rail located at a downstream position and a slim column continuous to the downstream end of the primary rear rail, in the same manner as the rear rail 25a. Otherwise, as shown in FIG. 9, for example, a single rear rail 61 may replace the aforementioned rear rails 25a, 25b. The single rear rail 61 may be located at a central position in the lateral direction of the slider body 22, for example. Furthermore, the aforementioned flying head sliders 14 may be employed not only in a magnetic disk drive or storage system such as the aforementioned HDD 10 but also in the other types of recording disk or medium drive including a magnetooptical disk or medium drive.

What is claimed is:

1. A flying head slider comprising:
   a slider body having a medium-opposed surface, said medium-opposed surface having a leading end and a trailing end, the surface extending in a lateral direction traverse to a direction formed by a line extending generally from the leading end to the trailing end;
   a front air bearing surface near the leading end;
   a rear air bearing surface near the trailing end and extending a predetermined distance from a base of the medium-opposed surface;
   a pad extending a distance from the base greater than the predetermined distance;
   a rail extending from the base of the medium-opposed surface, said rear air bearing surface being defined by an outer surface of the rail; and
   a step formed on the outer surface of the rail at a leading end of the rear air bearing surface, wherein
   the rail has a trailing end narrowed in the lateral direction near the trailing end of the medium-opposed surface.

2. The flying head slider according to claim 1, wherein the rail is tapered in the lateral direction near the trailing end of the medium-opposed surface.

3. The flying head slider according to claim 2, wherein the pad extends from a plane which is less than the predetermined distance from the base.

4. The flying head slider according to claim 1, wherein the rail comprises:
   a primary rail extending on the base of the medium-opposed surface near the trailing end of the medium-opposed surface, an outer surface of said primary rail extending the predetermined distance from the base of the medium-opposed surface; and
   a slim column extending from the base and having an outer surface narrower in the lateral direction than the outer surface of the primary rail, said outer surface of the slim column being continuously slim to a trailing end of the primary rail.

5. The flying head slider according to claim 4, wherein the pad extends from a plane which is less than the predetermined distance from the base.

6. A flying head slider comprising:
   a slider body having a medium-opposed surface, said medium-opposed surface having a leading end and a trailing end, the surface extending in a lateral direction traverse to a direction formed by a line extending generally from the leading end to the trailing end;
   an air bearing surface extending a predetermined distance from a base of the medium-opposed surface;
   a pad extending a distance from the base greater than the predetermined distance;
   a rail extending from the base of the medium-opposed surface, said air bearing surface being defined by an outer surface of the rail; and
   a step formed on the outer surface of the rail at a leading end of the air bearing surface, wherein the rail has a trailing end narrowed in the lateral direction.

7. The flying head slider according to claim 6, wherein the rail is tapered in the lateral direction near the trailing end of the medium-opposed surface.

8. The flying head slider according to claim 7, wherein the pad extends from a plane which is less than the predetermined distance from the base.

9. The flying head slider according to claim 6, wherein the rail comprises:
   a primary rail extending on the base of the medium-opposed surface near the trailing end of the medium-opposed surface, an outer surface of said primary rail extending the predetermined distance from the base of the medium-opposed surface; and
   a slim column extending from the base and having an outer surface narrower in the lateral direction than the outer surface of the primary rail, said outer surface of the slim column being continuously slim to a trailing end of the primary rail.

10. The flying head slider according to claim 9, wherein the pad extends from a plane which is less than the predetermined distance from the base.

* * * * *